United States Patent
Vanman et al.

(10) Patent No.: US 10,341,605 B1
(45) Date of Patent: Jul. 2, 2019

(54) SYSTEMS AND METHODS FOR MULTIPLE-RESOLUTION STORAGE OF MEDIA STREAMS

(71) Applicant: WatchGuard, Inc., Allen, TX (US)

(72) Inventors: Robert V. Vanman, McKinney, TX (US); James Walter Exner, Plano, TX (US)

(73) Assignee: WatchGuard, Inc., Allen, TX (US)

( * ) Notice: Subject to any disclaimer, the term of this patent is extended or adjusted under 35 U.S.C. 154(b) by 100 days.

(21) Appl. No.: 15/481,214

(22) Filed: Apr. 6, 2017

Related U.S. Application Data

(60) Provisional application No. 62/319,364, filed on Apr. 7, 2016.

(51) Int. Cl.
| | | |
|---|---|---|
| *H04B 7/01* | (2006.01) | |
| *H04N 7/01* | (2006.01) | |
| *G11B 27/031* | (2006.01) | |
| *H04N 5/262* | (2006.01) | |
| *H04N 5/232* | (2006.01) | |

(Continued)

(52) U.S. Cl.
CPC ....... *H04N 7/0117* (2013.01); *G06K 9/00771* (2013.01); *G11B 27/031* (2013.01); *H04N 5/23296* (2013.01); *H04N 5/2628* (2013.01); *H04N 5/91* (2013.01); *G06K 2209/15* (2013.01);
(Continued)

(58) Field of Classification Search
CPC ............. H04N 7/0117; H04N 5/23296; H04N 5/2628; H04N 5/91; G11B 27/031; G06K 9/00771; G06K 2209/23; G06K 2209/15; G06K 2209/21

USPC ............... 386/226, 232; 348/148, 143, 149; 375/240.11; 382/104
See application file for complete search history.

(56) References Cited

U.S. PATENT DOCUMENTS

| | | |
|---|---|---|
| 3,752,047 A | 8/1973 | Gordon et al. |
| 4,258,421 A | 3/1981 | Juhasz et al. |

(Continued)

FOREIGN PATENT DOCUMENTS

| | | |
|---|---|---|
| EP | 707297 A1 | 4/1996 |
| FR | 2698596 B1 | 2/1995 |

(Continued)

OTHER PUBLICATIONS

Sony Corporation; "Network Camera: User's Guide: Software Version 1.0: SNC-RZ25N/RZ25P"; 2004; 81 pages.

(Continued)

*Primary Examiner* — Thai Q Tran
*Assistant Examiner* — Stephen R Smith
(74) *Attorney, Agent, or Firm* — Winstead PC

(57) ABSTRACT

In an embodiment, a method includes continuously receiving, from a camera, raw video frames at an initial resolution. The method also includes, for each raw video frame, as the raw video frame is received: downscaling the raw video frame to a first resolution to yield a first scaled video frame; downscaling the raw video frame to a second resolution distinct from the first resolution to yield a second scaled video frame; identifying a location of a target; cropping at least video frame based, at least in part, on the location of the target; and storing the first scaled video frame, the second scaled video frame, and information related to the cropped at least one video frame as part of a first video stream, a second video stream, and a third video stream, respectively.

20 Claims, 3 Drawing Sheets

(51) Int. Cl.
*H04N 5/91* (2006.01)
*G06K 9/00* (2006.01)

(52) U.S. Cl.
CPC ..... *G06K 2209/21* (2013.01); *G06K 2209/23* (2013.01)

(56) References Cited

U.S. PATENT DOCUMENTS

| | | | |
|---|---|---|---|
| 4,389,706 A | 6/1983 | Gomola et al. |
| 4,420,238 A | 12/1983 | Felix |
| 4,688,244 A | 8/1987 | Hannon et al. |
| 4,754,255 A | 6/1988 | Sanders et al. |
| 4,786,900 A | 11/1988 | Karasawa et al. |
| 4,789,904 A | 12/1988 | Peterson |
| 4,831,438 A | 5/1989 | Bellman, Jr. et al. |
| 4,843,463 A | 6/1989 | Michetti |
| 4,949,186 A | 8/1990 | Peterson |
| 4,992,943 A | 2/1991 | McCracken |
| 4,993,068 A | 2/1991 | Piosenka et al. |
| 5,027,104 A | 6/1991 | Reid |
| 5,111,289 A | 5/1992 | Lucas et al. |
| 5,136,655 A | 8/1992 | Bronson |
| 5,164,827 A | 11/1992 | Paff |
| 5,185,667 A | 2/1993 | Zimmermann |
| 5,204,536 A | 4/1993 | Vardi |
| 5,225,882 A | 7/1993 | Hosokawa et al. |
| 5,430,431 A | 7/1995 | Nelson |
| 5,485,611 A | 1/1996 | Astle |
| 5,491,464 A | 2/1996 | Carter et al. |
| 5,491,511 A | 2/1996 | Odle |
| 5,515,042 A | 5/1996 | Nelson |
| 5,539,454 A | 7/1996 | Williams |
| 5,570,127 A | 10/1996 | Schmidt |
| 5,579,239 A | 11/1996 | Freeman et al. |
| 5,651,075 A | 7/1997 | Frazier et al. |
| 5,677,979 A | 10/1997 | Squicciarini et al. |
| 5,682,133 A | 10/1997 | Johnson et al. |
| 5,689,442 A | 11/1997 | Swanson et al. |
| 5,703,604 A | 12/1997 | McCutchen |
| 5,708,780 A | 1/1998 | Levergood et al. |
| 5,726,450 A | 3/1998 | Peterson et al. |
| 5,734,337 A | 3/1998 | Kupersmit |
| 5,742,336 A | 4/1998 | Lee |
| 5,784,023 A | 7/1998 | Bluege |
| 5,787,367 A | 7/1998 | Berra |
| 5,799,083 A | 8/1998 | Brothers et al. |
| 5,809,161 A | 9/1998 | Auty et al. |
| 5,815,093 A | 9/1998 | Kikinis |
| 5,818,864 A | 10/1998 | van Goor et al. |
| 5,844,599 A | 12/1998 | Hildin |
| 5,852,664 A | 12/1998 | Iverson et al. |
| 5,857,159 A | 1/1999 | Dickrell et al. |
| 5,890,079 A | 3/1999 | Levine |
| 5,898,866 A | 4/1999 | Atkins et al. |
| 5,917,405 A | 6/1999 | Joao |
| 5,920,338 A | 7/1999 | Katz |
| 5,926,210 A | 7/1999 | Hackett et al. |
| 5,936,683 A | 8/1999 | Lin |
| 5,963,248 A | 10/1999 | Ohkawa et al. |
| 6,008,841 A | 12/1999 | Charlson |
| 6,028,528 A | 2/2000 | Lorenzetti et al. |
| 6,037,977 A | 3/2000 | Peterson |
| 6,076,026 A | 6/2000 | Jambhekar et al. |
| 6,092,008 A | 7/2000 | Bateman |
| 6,121,898 A | 9/2000 | Moetteli |
| 6,141,611 A | 10/2000 | Mackey et al. |
| 6,151,065 A | 11/2000 | Steed et al. |
| 6,211,907 B1 | 4/2001 | Scaman et al. |
| 6,215,519 B1 | 4/2001 | Nayar et al. |
| 6,252,989 B1 | 6/2001 | Geisler et al. |
| 6,259,475 B1 | 7/2001 | Ramachandran et al. |
| 6,282,462 B1 | 8/2001 | Hopkins |
| 6,326,714 B1 | 12/2001 | Bandera |
| 6,330,025 B1 | 12/2001 | Arazi et al. |
| 6,332,193 B1 | 12/2001 | Glass et al. |
| 6,335,789 B1 | 1/2002 | Kikuchi |
| 6,345,219 B1 | 2/2002 | Klemens |
| 6,373,962 B1 | 4/2002 | Kanade et al. |
| 6,389,340 B1 | 5/2002 | Rayner |
| 6,421,080 B1 | 7/2002 | Lambert |
| 6,430,488 B1 | 8/2002 | Goldman et al. |
| 6,445,824 B2 | 9/2002 | Hieda |
| 6,456,321 B1 | 9/2002 | Ito et al. |
| 6,490,513 B1 | 12/2002 | Fish et al. |
| 6,518,881 B2 | 2/2003 | Monroe |
| 6,542,076 B1 | 4/2003 | Joao |
| 6,545,601 B1 | 4/2003 | Monroe |
| 6,546,119 B2 | 4/2003 | Ciolli et al. |
| 6,546,363 B1 | 4/2003 | Hagenbuch |
| 6,553,131 B1 | 4/2003 | Neubauer et al. |
| 6,556,905 B1 | 4/2003 | Mittelsteadt et al. |
| 6,559,769 B2 | 5/2003 | Anthony et al. |
| 6,631,522 B1 | 10/2003 | Erdelyi |
| 6,636,256 B1 | 10/2003 | Passman et al. |
| 6,684,137 B2 | 1/2004 | Takagi et al. |
| 6,696,978 B2 | 2/2004 | Trajkovic et al. |
| 6,704,281 B1 | 3/2004 | Hourunranta et al. |
| 6,707,489 B1 | 3/2004 | Maeng et al. |
| 6,734,911 B1 | 5/2004 | Lyons |
| 6,754,663 B1 | 6/2004 | Small et al. |
| 6,801,574 B2 | 10/2004 | Takeuchi et al. |
| 6,812,835 B2 | 11/2004 | Ito et al. |
| 6,831,556 B1 | 12/2004 | Boykin |
| 6,914,541 B1 | 7/2005 | Zierden |
| 6,950,013 B2 | 9/2005 | Scaman et al. |
| 6,950,122 B1 | 9/2005 | Mirabile |
| 6,959,122 B2 | 10/2005 | McIntyre |
| 6,965,400 B1 | 11/2005 | Haba et al. |
| 7,023,913 B1 | 4/2006 | Monroe |
| 7,119,674 B2 | 10/2006 | Sefton |
| 7,119,832 B2 | 10/2006 | Blanco et al. |
| 7,131,136 B2 | 10/2006 | Monroe |
| 7,180,407 B1 | 2/2007 | Guo et al. |
| 7,190,882 B2 | 3/2007 | Gammenthaler |
| 7,215,876 B2 | 5/2007 | Okada et al. |
| 7,262,790 B2 | 8/2007 | Bakewell |
| 7,272,179 B2 | 9/2007 | Siemens et al. |
| 7,363,742 B2 | 4/2008 | Nerheim |
| 7,373,395 B2 | 5/2008 | Brailean et al. |
| 7,382,244 B1 | 6/2008 | Donovan et al. |
| 7,405,834 B1 | 7/2008 | Marron et al. |
| 7,471,334 B1 | 12/2008 | Stenger |
| 7,495,579 B2 | 2/2009 | Sirota et al. |
| 7,570,158 B2 | 8/2009 | Denny et al. |
| 7,570,476 B2 | 8/2009 | Nerheim |
| 7,574,131 B2 | 8/2009 | Chang et al. |
| 7,583,290 B2 | 9/2009 | Enright et al. |
| 7,646,312 B2 | 1/2010 | Rosen |
| 7,702,015 B2 * | 4/2010 | Richter ............... H04N 5/77 348/121 |
| 7,711,150 B2 | 5/2010 | Simon |
| 7,768,548 B2 | 8/2010 | Silvernail et al. |
| 7,787,025 B2 | 8/2010 | Sanno et al. |
| 7,804,426 B2 | 9/2010 | Etcheson |
| 7,880,766 B2 | 2/2011 | Aoki et al. |
| 7,894,632 B2 | 2/2011 | Park et al. |
| 7,920,187 B2 | 4/2011 | Sanno et al. |
| 7,929,010 B2 | 4/2011 | Narasimhan |
| 7,944,676 B2 | 5/2011 | Smith et al. |
| 7,973,853 B2 | 7/2011 | Ojima et al. |
| 7,995,652 B2 | 8/2011 | Washington |
| 8,022,874 B2 | 9/2011 | Frieaizen |
| 8,026,945 B2 * | 9/2011 | Garoutte .......... G08B 13/19608 348/143 |
| 8,037,348 B2 | 10/2011 | Wei et al. |
| 8,050,206 B2 | 11/2011 | Siann et al. |
| 8,228,364 B2 | 7/2012 | Cilia |
| 8,446,469 B2 | 5/2013 | Blanco et al. |
| 8,487,995 B2 | 7/2013 | Vanman et al. |
| 8,570,376 B1 * | 10/2013 | Sharma ................ H04N 7/18 348/159 |
| 8,594,485 B2 | 11/2013 | Brundula |
| 8,599,368 B1 | 12/2013 | Cilia et al. |
| 8,630,497 B2 | 1/2014 | Badawy et al. |

(56) References Cited

U.S. PATENT DOCUMENTS

| | | | |
|---|---|---|---|
| 8,736,680 B1 | 5/2014 | Cilia et al. | |
| 8,781,292 B1 | 7/2014 | Ross et al. | |
| 8,805,431 B2 | 8/2014 | Vasavada et al. | |
| 8,819,686 B2 | 8/2014 | Memik et al. | |
| 8,837,901 B2 | 9/2014 | Shekarri et al. | |
| 8,964,054 B2* | 2/2015 | Jung | H04N 5/232 348/211.11 |
| 8,982,944 B2* | 3/2015 | Vanman | H04N 19/59 348/568 |
| 9,058,499 B1 | 6/2015 | Smith | |
| 9,134,338 B2 | 9/2015 | Cilia et al. | |
| 9,159,371 B2 | 10/2015 | Ross et al. | |
| 9,253,452 B2 | 2/2016 | Ross et al. | |
| 9,262,800 B2 | 2/2016 | Cilia | |
| 9,325,950 B2 | 4/2016 | Haler | |
| 9,331,997 B2 | 5/2016 | Smith | |
| 9,377,161 B2 | 6/2016 | Hanchett et al. | |
| 9,432,298 B1 | 8/2016 | Smith | |
| 9,456,131 B2* | 9/2016 | Tran | H04N 5/23238 |
| 9,584,710 B2* | 2/2017 | Marman | G08B 13/19652 |
| 9,615,062 B2* | 4/2017 | Sablak | H04N 7/18 |
| 9,716,913 B2* | 7/2017 | Sivasankaran | G11B 27/036 |
| 9,860,536 B2* | 1/2018 | Cilia | H04N 19/17 |
| 9,973,711 B2* | 5/2018 | Yang | G06T 3/40 |
| 10,186,012 B2* | 1/2019 | Newman | G06T 3/00 |
| 10,230,866 B1* | 3/2019 | Townsend | H04N 1/2108 |
| 2001/0052137 A1 | 12/2001 | Klein | |
| 2002/0040475 A1 | 4/2002 | Yap et al. | |
| 2002/0064314 A1 | 5/2002 | Comaniciu et al. | |
| 2002/0135679 A1 | 9/2002 | Scaman | |
| 2002/0140924 A1 | 10/2002 | Wangler et al. | |
| 2002/0141618 A1 | 10/2002 | Ciolli et al. | |
| 2002/0141650 A1 | 10/2002 | Keeney et al. | |
| 2002/0149476 A1 | 10/2002 | Ogura | |
| 2002/0180759 A1 | 12/2002 | Park et al. | |
| 2002/0183905 A1 | 12/2002 | Maeda et al. | |
| 2002/0186148 A1 | 12/2002 | Trajkovic et al. | |
| 2002/0186297 A1 | 12/2002 | Bakewell | |
| 2003/0025599 A1 | 2/2003 | Monroe | |
| 2003/0025812 A1 | 2/2003 | Slatter | |
| 2003/0052798 A1 | 3/2003 | Hanson | |
| 2003/0071891 A1 | 4/2003 | Geng | |
| 2003/0080878 A1 | 5/2003 | Kirmuss | |
| 2003/0086000 A1 | 5/2003 | Siemens et al. | |
| 2003/0095338 A1 | 5/2003 | Singh et al. | |
| 2003/0112133 A1 | 6/2003 | Webb et al. | |
| 2003/0142209 A1 | 7/2003 | Yamazaki et al. | |
| 2003/0151663 A1 | 8/2003 | Lorenzetti et al. | |
| 2003/0154009 A1 | 8/2003 | Basir et al. | |
| 2003/0172123 A1 | 9/2003 | Polan et al. | |
| 2003/0185419 A1 | 10/2003 | Sumitomo | |
| 2003/0210329 A1 | 11/2003 | Aagaard et al. | |
| 2003/0210806 A1 | 11/2003 | YoichiShintani et al. | |
| 2003/0212567 A1 | 11/2003 | Shintani et al. | |
| 2003/0214585 A1 | 11/2003 | Bakewell | |
| 2004/0008255 A1 | 1/2004 | Lewellen | |
| 2004/0017930 A1 | 1/2004 | Kim et al. | |
| 2004/0021852 A1 | 2/2004 | DeFlumere | |
| 2004/0056779 A1 | 3/2004 | Rast | |
| 2004/0080615 A1 | 4/2004 | Klein et al. | |
| 2004/0096084 A1 | 5/2004 | Tamoto et al. | |
| 2004/0119869 A1 | 6/2004 | Tretter et al. | |
| 2004/0150717 A1 | 8/2004 | Page et al. | |
| 2004/0189804 A1 | 9/2004 | Borden et al. | |
| 2004/0201765 A1 | 10/2004 | Gammenthaler | |
| 2004/0218099 A1 | 11/2004 | Washington | |
| 2004/0221311 A1 | 11/2004 | Dow et al. | |
| 2004/0223058 A1 | 11/2004 | Richter et al. | |
| 2004/0252193 A1 | 12/2004 | Higgins | |
| 2004/0258149 A1 | 12/2004 | Robinson et al. | |
| 2005/0083404 A1 | 4/2005 | Pierce et al. | |
| 2005/0090961 A1 | 4/2005 | Bonk et al. | |
| 2005/0099273 A1 | 5/2005 | Shimomura et al. | |
| 2005/0100329 A1 | 5/2005 | Lao et al. | |
| 2005/0101334 A1 | 5/2005 | Brown et al. | |
| 2005/0128064 A1 | 6/2005 | Riesebosch | |
| 2005/0151671 A1 | 7/2005 | Bortolotto | |
| 2005/0151852 A1 | 7/2005 | Jomppanen | |
| 2005/0196140 A1 | 9/2005 | Moteki | |
| 2005/0206773 A1 | 9/2005 | Kim et al. | |
| 2005/0212912 A1 | 9/2005 | Huster | |
| 2005/0243171 A1 | 11/2005 | Ross et al. | |
| 2005/0258942 A1 | 11/2005 | Manasseh et al. | |
| 2006/0010199 A1 | 1/2006 | Brailean et al. | |
| 2006/0012683 A9 | 1/2006 | Lao et al. | |
| 2006/0028547 A1 | 2/2006 | Chang | |
| 2006/0033813 A1 | 2/2006 | Provinsal et al. | |
| 2006/0098843 A1 | 5/2006 | Chew | |
| 2006/0126932 A1 | 6/2006 | Eschbach | |
| 2006/0132604 A1 | 6/2006 | Lao et al. | |
| 2006/0133476 A1 | 6/2006 | Page et al. | |
| 2006/0152636 A1 | 7/2006 | Matsukawa et al. | |
| 2006/0158968 A1 | 7/2006 | Vanman et al. | |
| 2006/0159325 A1 | 7/2006 | Zeineh et al. | |
| 2006/0187305 A1 | 8/2006 | Trivedi et al. | |
| 2006/0193384 A1 | 8/2006 | Boyce | |
| 2006/0209189 A1 | 9/2006 | Simpson | |
| 2006/0244826 A1 | 11/2006 | Chew | |
| 2006/0269265 A1 | 11/2006 | Wright et al. | |
| 2006/0274166 A1 | 12/2006 | Lee et al. | |
| 2007/0013776 A1 | 1/2007 | Venetianer et al. | |
| 2007/0024706 A1 | 2/2007 | Brannon et al. | |
| 2007/0029825 A1 | 2/2007 | Franklin et al. | |
| 2007/0035612 A1 | 2/2007 | Korneluk et al. | |
| 2007/0058856 A1 | 3/2007 | Boregowda et al. | |
| 2007/0069921 A1 | 3/2007 | Sefton | |
| 2007/0097212 A1 | 5/2007 | Farneman | |
| 2007/0109411 A1 | 5/2007 | Jung et al. | |
| 2007/0122000 A1 | 5/2007 | Venetianer et al. | |
| 2007/0188612 A1 | 8/2007 | Carter | |
| 2007/0200933 A1 | 8/2007 | Watanabe et al. | |
| 2007/0217761 A1 | 9/2007 | Chen et al. | |
| 2007/0219686 A1 | 9/2007 | Plante | |
| 2007/0221233 A1 | 9/2007 | Kawano et al. | |
| 2007/0222678 A1 | 9/2007 | Ishio et al. | |
| 2007/0222859 A1 | 9/2007 | Chang et al. | |
| 2007/0225550 A1 | 9/2007 | Gattani et al. | |
| 2007/0230943 A1 | 10/2007 | Chang et al. | |
| 2007/0260363 A1 | 11/2007 | Miller | |
| 2007/0268370 A1 | 11/2007 | Sanno et al. | |
| 2007/0274705 A1 | 11/2007 | Kashiwa et al. | |
| 2007/0291104 A1 | 12/2007 | Petersen et al. | |
| 2007/0296817 A1 | 12/2007 | Ebrahimi et al. | |
| 2008/0002028 A1 | 1/2008 | Miyata | |
| 2008/0007438 A1 | 1/2008 | Segall et al. | |
| 2008/0036580 A1 | 2/2008 | Breed | |
| 2008/0100705 A1 | 5/2008 | Kister et al. | |
| 2008/0129844 A1 | 6/2008 | Cusack et al. | |
| 2008/0167001 A1 | 7/2008 | Wong | |
| 2008/0175479 A1 | 7/2008 | Sefton et al. | |
| 2008/0218596 A1 | 9/2008 | Hoshino | |
| 2008/0240616 A1 | 10/2008 | Haering et al. | |
| 2008/0285803 A1 | 11/2008 | Madsen | |
| 2008/0301088 A1 | 12/2008 | Landry et al. | |
| 2009/0002491 A1 | 1/2009 | Haler | |
| 2009/0046157 A1 | 2/2009 | Cilia et al. | |
| 2009/0049491 A1 | 2/2009 | Karonen et al. | |
| 2009/0088267 A1 | 4/2009 | Shimazaki et al. | |
| 2009/0102950 A1 | 4/2009 | Ahiska | |
| 2009/0129672 A1 | 5/2009 | Camp, Jr. et al. | |
| 2009/0195655 A1 | 8/2009 | Pandey | |
| 2009/0207248 A1 | 8/2009 | Cilia et al. | |
| 2009/0207252 A1 | 8/2009 | Raghunath | |
| 2009/0213218 A1 | 8/2009 | Cilia et al. | |
| 2009/0237529 A1 | 9/2009 | Nakagomi et al. | |
| 2009/0251530 A1 | 10/2009 | Cilia | |
| 2009/0259865 A1 | 10/2009 | Sheynblat et al. | |
| 2009/0295919 A1 | 12/2009 | Chen et al. | |
| 2009/0300692 A1 | 12/2009 | Mavlankar et al. | |
| 2009/0320081 A1 | 12/2009 | Chui et al. | |
| 2010/0026802 A1 | 2/2010 | Titus et al. | |
| 2010/0118147 A1 | 5/2010 | Dorneich et al. | |
| 2010/0165109 A1 | 7/2010 | Lang | |
| 2010/0208068 A1 | 8/2010 | Elsemore | |

(56) References Cited

U.S. PATENT DOCUMENTS

| | | | |
|---|---|---|---|
| 2010/0225817 | A1 | 9/2010 | Sheraizin et al. |
| 2010/0238327 | A1 | 9/2010 | Griffith et al. |
| 2010/0245568 | A1 | 9/2010 | Wike, Jr. et al. |
| 2010/0265331 | A1 | 10/2010 | Tanaka |
| 2010/0321183 | A1 | 12/2010 | Donovan et al. |
| 2011/0042462 | A1 | 2/2011 | Smith |
| 2011/0052137 | A1 | 3/2011 | Cowie |
| 2011/0053654 | A1 | 3/2011 | Petrescu et al. |
| 2011/0074580 | A1 | 3/2011 | Mercier et al. |
| 2011/0110556 | A1 | 5/2011 | Kawakami |
| 2011/0134141 | A1 | 6/2011 | Swanson et al. |
| 2011/0157376 | A1 | 6/2011 | Lyu et al. |
| 2011/0234749 | A1 | 9/2011 | Alon |
| 2011/0242277 | A1 | 10/2011 | Do et al. |
| 2011/0249153 | A1 | 10/2011 | Hirooka et al. |
| 2011/0267499 | A1 | 11/2011 | Wan et al. |
| 2011/0285845 | A1 | 11/2011 | Bedros et al. |
| 2011/0292287 | A1 | 12/2011 | Washington |
| 2011/0310435 | A1 | 12/2011 | Tsuji et al. |
| 2012/0040650 | A1 | 2/2012 | Rosen |
| 2012/0069224 | A1 | 3/2012 | Cilia et al. |
| 2012/0092522 | A1 | 4/2012 | Zhang et al. |
| 2012/0236112 | A1 | 9/2012 | Cilia |
| 2013/0150004 | A1 | 6/2013 | Rosen |
| 2013/0279757 | A1 | 10/2013 | Kephart |
| 2013/0287090 | A1 | 10/2013 | Sasaki et al. |
| 2013/0336634 | A1 | 12/2013 | Vanman et al. |
| 2014/0059166 | A1 | 2/2014 | Mann et al. |
| 2014/0139680 | A1 | 5/2014 | Huang et al. |
| 2014/0192192 | A1 | 7/2014 | Worrill et al. |
| 2014/0201064 | A1 | 7/2014 | Jackson et al. |
| 2014/0226952 | A1 | 8/2014 | Cilia et al. |
| 2014/0240500 | A1 | 8/2014 | Davies |
| 2014/0355951 | A1 | 12/2014 | Tabak |
| 2015/0050923 | A1 | 2/2015 | Tu et al. |
| 2015/0051502 | A1 | 2/2015 | Ross |
| 2015/0054639 | A1 | 2/2015 | Rosen |
| 2015/0063776 | A1 | 3/2015 | Ross et al. |
| 2016/0035391 | A1 | 2/2016 | Ross et al. |
| 2016/0073025 | A1 | 3/2016 | Cilia |
| 2017/0215971 | A1 | 8/2017 | Gattani et al. |
| 2018/0103255 | A1 | 4/2018 | Cilia et al. |

FOREIGN PATENT DOCUMENTS

| | | |
|---|---|---|
| GB | 2287152 A | 9/1995 |
| GB | 2317418 A | 3/1998 |
| JP | 2006311039 A | 11/2006 |
| KR | 10-1050897 B1 | 7/2011 |
| WO | WO-1993020655 A1 | 10/1993 |
| WO | WO-1994019212 A2 | 9/1994 |
| WO | WO-1995028783 A1 | 10/1995 |
| WO | WO-1996022202 A1 | 7/1996 |
| WO | WO-1997038526 A1 | 10/1997 |
| WO | WO-1998052358 A1 | 11/1998 |
| WO | WO-1999018410 A1 | 4/1999 |
| WO | WO-01097524 A1 | 12/2001 |
| WO | WO-2004/036926 A2 | 4/2004 |
| WO | WO-2007104367 A1 | 9/2007 |
| WO | WO-2013100993 A1 | 7/2013 |
| WO | WO-2014000161 A1 | 1/2014 |
| WO | WO-2016089918 A1 | 6/2016 |

OTHER PUBLICATIONS

U.S. Appl. No. 12/694,931, Cilia.
U.S. Appl. No. 12/779,492, Vanman.
U.S. Appl. No. 12/779,564, Vanman.
U.S. Appl. No. 12/780,050, Vanman.
U.S. Appl. No. 12/780,092, Vanman.
U.S. Appl. No. 12/362,302, Andrew Cilia et al.
U.S. Appl. No. 13/095,107, Cilia.
U.S. Appl. No. 13/109,557, Cilia.
U.S. Appl. No. 14/788,556, Cilia et al.
U.S. Appl. No. 14/942,838, Cilia.
Carlier, Axel, et al.; "Combining Content-Based Analyis and Crowdsourcing to Improve User Interaction with Zoomable Video"; Proceedings of the 19th International Conference on Multimedia 2011; Nov. 28-Dec. 1, 2011; pp. 43-52.
Mavlankar, Aditya, et al.; "Region-of-Interest Prediction for Interactively Streaming Regions of High Resolution Video"; Proceedings of the 16th IEEE International Packet Video Workshop; Nov. 2007; 10 pages.
Copenheaver, Blaine R., International Search Report for PCT/US2009/000930 dated Apr. 9, 2009.
Young, Lee W., International Search Report for PCT/US2009/000934 dated Apr. 29, 2009.
Copenheaver, Blaine R., International Search Report for PCT/US2010030861 dated Jun. 21, 2010.
Nhon, Diep T., International Search Report for PCT/US05/36701 dated Oct. 25, 2006.
Copenheaver, Blaine R., International Search Report for PCT/US2009/032462 dated Mar. 10, 2009.
Kortum, P. et al., "Implementation of a foveated image coding system for image bandwidth reduction", SPIE Proceedings, vol. 2657, 1996, pp. 350-360, XP-002636638.
Geisler, Wilson S. et al., "A real-time foveated multiresolution system for low-bandwidth video communication", Proceedings of the SPIE—The International Society for Optical Engineering SPIE—Int. Soc. Opt. Eng. USA, vol. 3299,1998, pp. 294-305, XP-002636639.
Rowe, Lawrence A., et al.; "Indexes for User Access to Large Video Databases"; Storage and Retrieval for Image and Video Databases II, IS&T/SPIE Symp. on Elec. Imaging Sci. & Tech.; San Jose, CA; Feb. 1994; 12 pages.
Polybius; "The Histories," vol. III: Books 5-8; Harvard University Press; 1923; pp. 385 & 387.
Crisman, P.A. (editor); "The Compatible Time-Sharing System: A Programmer's Guide," second edition; The M.I.T. Press, Cambridge Massachusetts; 1965; 587 pages.
Kotadia, Munir; "Gates Predicts Death of the Password"; http://www.cnet.com/news/gates-predicts-death-of-the-password/?ftag=CADe856116&bhid=; Feb. 25, 2004; 3 pages.
Morris, Robert, et al.; "Password Security: A Case History"; Communications of the ACM, vol. 22, No. 11; Nov. 1979; pp. 594-597.
Cranor, Lorrie Faith, et al.; "Security and Usability: Designing Secure Systems that People Can Use"; O'Reilly Media; Aug. 2005; pp. 3 & 104.
Chirillo, John; "Hack Attacks Encyclopedia: A Complete History of Hacks, Cracks, Phreaks, and Spies Over Time"; John Wiley & Sons, Inc.; 2001; 485-486.
Stonebraker, Michael, et al.; "Object-Relational DBMSs: Tracking the Next Great Wave"; Second Ed.; Morgan Kaufmann Publishers, Inc.; 1999; pp. 3, 173, 232-237, 260.
Stonebraker, Michael, et al.; "Object-Relational DBMSs: The Next Great Wave"; Morgan Kaufmann Publishers, Inc.; 1996; pp. 105, 107, 166-168.
Barwick, Sandra; "Two Wheels Good, Four Wheels Bad"; The Independent; http://www.independent.co.uk/voices/two-wheels-good-four-wheels-bad-1392034.html; Feb. 4, 1994; 11 pages.
McFee, John E., et al.; "Multisensor Vehicle-Mounted Teleoperated Mine Detector with Data Fusion"; SPIE Proceedings, vol. 3392; Apr. 13, 1998; 2 pages.
Malcolm, Andrew H.; "Drunken Drivers Now Facing Themselves on Video Camera"; The New York Times; http://www.nytimes.com/1990/04/21/us/drunken-drivers-now-facing-themselves-on-video-camera.html; Apr. 21, 1990; 3 pages.
Kaplan, A.E., et al.; "An Internet Accessible Telepresence"; Multimedia Systems, vol. 5, Issue 2; Mar. 1997; Abstract only; 2 pages.
Sabatini, Richard V.; "State Police Cars in Pa. Get Cameras Patrol Stops Will be Videotaped. The Units will Benefit Citizens and Police, Authorities Say"; http://articles.philly.com/1996-03-30/news/25637501_1_patrol-car-state-police-commissioner-paul-j-evanko; Mar. 30, 1996; 2 pages.
Stockton, Gregory R., et al.; "Why Record? (Infrared Video)"; Infraspection Institute's IR/INFO '98 Symposium, Orlando, Florida; Jan. 25-28, 1998; 5 pages.

(56) References Cited

OTHER PUBLICATIONS

Racepak LLC; "Racepak DataLink Software" http://www.racepak.com/software.php.; Feb. 3, 2008; 4 pages.
Pavlopoulos, S., et al.; "A Novel Emergency Telemedicine System Based on Wireless Communication Technology—Ambulance"; IEEE Trans Inf Technol Biomed, vol. 2, No. 4; Dec. 1998; Abstract only; 2 pages.
Horne, Mike; "Future Video Accident Recorder"; http://www.iasa.com.au/folders/Publications/pdf_library/horne.pdf; May 1999; 9 pages.
Townsend & Taphouse; "Microsentinel I"; http://www.blacksheepnetworks.com/security/resources/encyclopedia/products/prod19.htm; Jul. 5, 2003; 1 page.
Security Data Networks, Inc.; "Best of Show Winner at CES Consumer Electronics Show is MicroSentinel(R) Wireless Internet Based Security System that Allows Users to Monitor their Home, Family, or Business using any Internet or E-Mail Connection"; PR Newswire; http://www.prnewswire.com/news-releases/best-of-show-winner-at-ces-consumer-electronics-show-is-microsentinelr-wireless-internet-based-security-system-that-allows-users-to-monitor-their-home-family-or-business-using-any-internet-or-e-mail-connection-73345197.html; Jan. 7, 1999; 3 pages.
Draper, Electra; "Mission Possible for Loronix"; Denver Post; http://extras.denverpost.com/business/top100b.htm; Aug. 13, 2000; 2 pages.
"Choosing the Right Password"; The Information Systems Security Monitor (ISSM); vol. 2, No. 2; Apr. 1992; 2 pages.
Aref, Walid G., et al.; "A Video Database Management System for Advancing Video Database Research"; In Proc. of the Int Workshop on Management Information Systems; Nov. 2002; 10 pages.
ICOP Extreme Wireless Mic, Operation Supplement; 2008.
Raytheon JPS Communications, Ratheon Model 20/20-W, Raytheon 20/20 Vision Digital In-Car Video Systems; Feb. 2010.
Product Review: ICOP Model 20/20-W; May 19, 2009.
State of Utah Invitation to Bid State Cooperative Contract, Contract No. MA503; Jul. 3, 2008.
X26 TASER; date unknown.
TASER X26 Specification Sheet; 2003.
Affidavit of Christopher Butler of Internet Archive attesting to the public availability of the 20/20-W Publication on Nov. 25, 2010.
International Association of Chiefs of Police Digital Video System Minimum Specifications Nov. 21, 2008.
City of Pomona Request for Proposal for Mobile Video Recording System for Police Vehicles; Apr. 4, 2013.
"TASER Int'l (TASR) Challenges to Digital Ally's (DGLY) Patents", StreetInsider.com, http://www.streetinsider.com/Corporate+News/TASER+Intl+(TASER)+Challenges+to+Digital+Allys+(DGLY)+Patents/12302550 html Dec. 1, 2016.

\* cited by examiner

SYSTEMS AND METHODS FOR MULTIPLE-RESOLUTION STORAGE OF MEDIA STREAMS

CROSS-REFERENCE TO RELATED APPLICATIONS

This patent application claims priority from, and incorporates by reference the entire disclosure of, U.S. Provisional Patent Application No. 62/319,364 filed on Apr. 7, 2016.

BACKGROUND

Technical Field

The present disclosure relates generally to media capture and more particularly, but not by way of limitation, to systems and methods for multiple-resolution storage of media streams.

History of Related Art

Capture devices such as video cameras may capture video for storage and playback. The computational and storage expense of video storage and playback increases in proportion to the resolution of video provided the video cameras.

SUMMARY OF THE INVENTION

In an embodiment, a method is performed by a computer system. The method includes continuously receiving, from a camera, raw video frames at an initial resolution. The method also includes, for each raw video frame, as the raw video frame is received: downscaling the raw video frame to a first resolution to yield a first scaled video frame; downscaling the raw video frame to a second resolution distinct from the first resolution to yield a second scaled video frame; identifying a location of a target in at least one of the raw video frame, the first scaled video frame, and the second scaled video frame; cropping at least video frame selected from among the raw video frame, the first scaled video frame, and the second scaled video frame based, at least in part, on the location of the target; and storing the first scaled video frame, the second scaled video frame, and information related to the cropped at least one video frame as part of a first video stream, a second video stream, and a third video stream, respectively.

In an embodiment, a system includes a computer processor and memory. The computer processor and memory in combination are operable to implement a method. The method includes continuously receiving, from a camera, raw video frames at an initial resolution. The method also includes, for each raw video frame, as the raw video frame is received: downscaling the raw video frame to a first resolution to yield a first scaled video frame; downscaling the raw video frame to a second resolution distinct from the first resolution to yield a second scaled video frame; identifying a location of a target in at least one of the raw video frame, the first scaled video frame, and the second scaled video frame; cropping at least video frame selected from among the raw video frame, the first scaled video frame, and the second scaled video frame based, at least in part, on the location of the target; and storing the first scaled video frame, the second scaled video frame, and information related to the cropped at least one video frame as part of a first video stream, a second video stream, and a third video stream, respectively.

In one embodiment, a computer-program product includes a non-transitory computer-usable medium having computer-readable program code embodied therein. The computer-readable program code is adapted to be executed to implement a method. The method includes continuously receiving, from a camera, raw video frames at an initial resolution. The method also includes, for each raw video frame, as the raw video frame is received: downscaling the raw video frame to a first resolution to yield a first scaled video frame; downscaling the raw video frame to a second resolution distinct from the first resolution to yield a second scaled video frame; identifying a location of a target in at least one of the raw video frame, the first scaled video frame, and the second scaled video frame; cropping at least video frame selected from among the raw video frame, the first scaled video frame, and the second scaled video frame based, at least in part, on the location of the target; and storing the first scaled video frame, the second scaled video frame, and information related to the cropped at least one video frame as part of a first video stream, a second video stream, and a third video stream, respectively.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
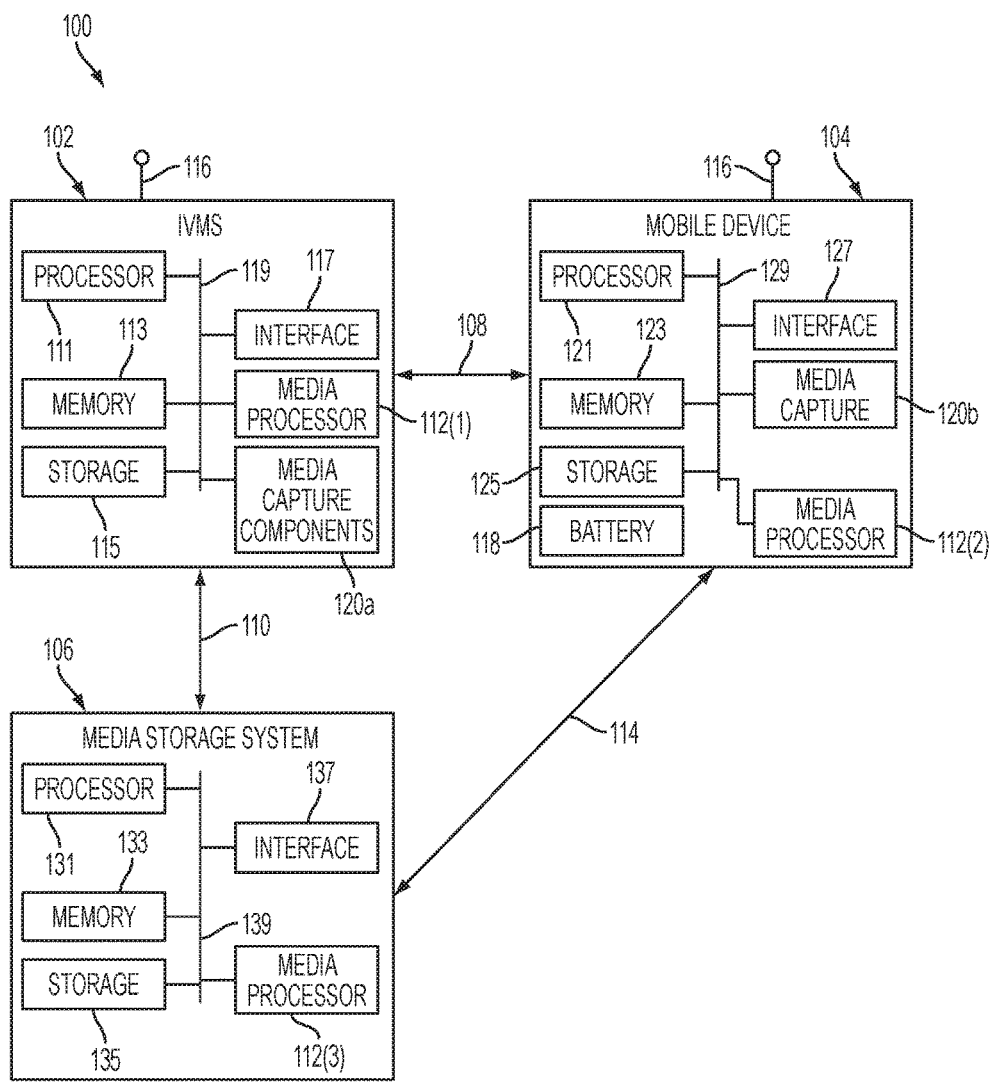
FIG. 1 illustrates an example of a system for intelligent, multiple-resolution storage of media streams.

In certain embodiments, capture devices, such as video cameras, can be integrated with a video-recording system and produce recordings of live media streams. A media stream can include video, audio, combinations of same, and/or the like. A captured media stream typically includes an audio and/or video recording.

In some embodiments, the video-recording system can include a collection of video cameras that are arranged to provide a 360-degree view relative to a point of reference. For example, four video cameras with 120-degree fields of view could be strategically arranged around a vehicle, such as a police car, to at least partially overlap and cover a 360-degree view from a perspective of the vehicle. The video cameras can be configured to record video upon certain triggers such as, for example, emergency-light activation, siren activation, a detected speed in excess of a threshold, excessive g-force events (e.g., collisions), manual activation of an individual video camera, combinations of same, and/or the like. The video-recording system can also include or be communicably coupled to mobile devices, such as wearable video cameras and other cameras, that can be configured, for example, to each make their own individual decisions on whether to record additional video from their respective vantage points.

Video from multiple video cameras can be highly advantageous for accurately depicting what has occurred over a given time period. While higher-resolution video is generally preferable to lower-resolution video from the standpoint of accurately depicting events, the storage, transmission, and playback costs of high-resolution video can be prohibitively expensive, particularly when numerous cameras are involved. For example, if a particular source video camera were to provide raw video at a resolution of 3960 by 2160, each uncompressed frame could have an approximate file size of 25.7 MB (RGB 8-bit frame) or 51.3 MB (RGB 16-bit frame). If that source video camera were to provide such video frames at thirty frames per second (fps), the corresponding bit rate could be approximately 2.05 Gigabits per second (Gbps) for a raw 3×8 bit or 12.3 Gbps for a raw 3×16 bit. The bit rate can quickly multiply in proportion to a number of cameras supplying video.

In many implementations, video recordings are produced on a continual basis over a period of time. For example, in a police implementation, video recordings of various lengths (e.g., five minutes, ten minutes, etc.) may be created over the course of a shift or a longer period (e.g., in emergency situations). Particularly in a mobile or portable storage environment such as a vehicle, storage resources are not always suitable for storing raw video of the type described above, from multiple video cameras, for hours or more at a time. Likewise, it is often not practical to transmit high-resolution video of the type described above over a network to central storage location due to bandwidth limitations. These are technical problems related to how data is transmitted and stored.

One way to address the above problems might be to encode video in a compressed and/or lower-resolution format. However, this approach would typically result in the loss of video detail, which detail might prove important to demonstrating what took place at a given time. Although this disadvantage might be mitigated by minimizing the amount of compression and/or resolution lowering that is performed, such mitigation would also reduce the resultant storage and transmission savings.

The present disclosure describes examples of intelligent, multiple-resolution storage of video data, for example, in mobile or portable video-storage environments. The intelligent, multiple-resolution storage can occur in real-time as raw video frames are received from video cameras. For purposes of this patent application, raw video or a raw video frame refers to a video or video frame, respectively, that is in its original format as provided by a capture source such as a video camera. In certain embodiments, a media system, such as an in-vehicle media system, can enhance its real-time knowledge of live media streams by automatically identifying targets and/or regions of interest in one or more fields of view. For example, the media system can downscale the raw video frames to multiple resolutions on a frame-by-frame basis. In addition, in some embodiments, the media system can perform additional processing on the identified regions of interest and store selected video at a relatively higher resolution.

FIG. 1 illustrates an example of a system 100 for intelligent, multiple-resolution storage of media streams. The system 100 can include an in-vehicle media system (IVMS) 102, a mobile device 104, and a media storage system 106. Although the IVMS 102, the mobile device 104, and the media storage system 106 are each shown singly, it should be appreciated that, in some embodiments, each can be representative of a plurality of such components. For example, the mobile device 104 can be representative of a plurality of mobile devices and the media storage system 106 can be representative of a plurality of storage locations that are available over a network.

In certain embodiments, the IVMS 102 can be communicably coupled to the mobile device 104 and the media storage system 106 via a communication link 108 and a communication link 110, respectively. In addition, in certain embodiments, the mobile device 104 can be communicably coupled to the media storage system 106 via a communication link 114. The communication links 108, 110 and 114 can be representative of wired and/or wireless communication. In some cases, the communication links 108, 110 and 114 can represent links that are periodically established, for example, in order to transfer captured media therebetween (e.g., from the mobile device 104 to the IVMS 102, from the mobile device 104 to the media storage system 106 and/or from the IVMS 102 to the media storage system 106).

The IVMS 102 is typically operable to receive, process, and store media such as audio and/or video as it is received from a source. An example of functionality that the IVMS 102 can include is described in U.S. Pat. No. 8,487,995 ("the '995 patent"). The '995 patent is hereby incorporated by reference. In general, the mobile device 104 can capture the media and, in some cases, provide same to the IVMS 102 in a continuous, ongoing fashion. The media storage system 106 can, in some embodiments, be implemented as a central storage system that stores captured media from multiple mobile devices similar to the mobile device 104 and/or from multiple media systems similar to the IVMS 102.

The IVMS 102, mobile device 104, and media storage system 106 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of IVMS 102, mobile device 104, and media storage system 106 may comprise any suitable physical form, configuration, number, type and/or layout. As an example, and not by way of limitation, IVMS 102, mobile device 104, and/or media storage system 106 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, IVMS 102, mobile device 104, and/or media storage system 106 may include one or more computer systems; be unitary or distributed; span multiple locations; span multiple machines; or reside in a cloud, which may include one or more cloud components in one or more networks.

In the depicted embodiment, IVMS 102, mobile device 104, and media storage system 106 each include their own respective processors 111, 121, and 131; memory 113, 123, and 133; storage 115, 125, and 135; interfaces 117, 127, and 137; and buses 119, 129, and 139. Although a system is depicted having a particular number of particular components in a particular arrangement, this disclosure contemplates any system having any suitable number of any suitable components in any suitable arrangement. For simplicity, similar components of IVMS 102, mobile device 104, and media storage system 106 will be discussed together while referring to the components of IVMS 102.

However, it is not necessary for these devices to have the same components, or the same type of components. For example, processor 111 may be a general purpose microprocessor and processor 121 may be an application specific integrated circuit (ASIC).

Processor 111 may be a microprocessor, controller, or any other suitable computing device, resource, or combination of hardware, software and/or encoded logic operable to provide, either alone or in conjunction with other components, (e.g., memory 113) wireless networking functionality. Such functionality may include providing various features discussed herein. In particular embodiments, processor 111 may include hardware for executing instructions, such as those making up a computer program. As an example and not by way of limitation, to execute instructions, processor 111 may retrieve (or fetch) instructions from an internal register, an internal cache, memory 113, or storage 115; decode and execute them; and then write one or more results to an internal register, an internal cache, memory 113, or storage 115.

In particular embodiments, processor 111 may include one or more internal caches for data, instructions, or addresses. This disclosure contemplates processor 111 including any suitable number of any suitable internal caches, where appropriate. As an example and not by way of limitation, processor 111 may include one or more instruction caches, one or more data caches, and one or more translation lookaside buffers (TLBs). Instructions in the instruction caches may be copies of instructions in memory 113 or storage 115 and the instruction caches may speed up retrieval of those instructions by processor 111. Data in the data caches may be copies of data in memory 113 or storage 115 for instructions executing at processor 111 to operate on; the results of previous instructions executed at processor 111 for access by subsequent instructions executing at processor 111, or for writing to memory 113, or storage 115; or other suitable data. The data caches may speed up read or write operations by processor 111. The TLBs may speed up virtual-address translations for processor 111. In particular embodiments, processor 111 may include one or more internal registers for data, instructions, or addresses. Depending on the embodiment, processor 111 may include any suitable number of any suitable internal registers, where appropriate. Where appropriate, processor 111 may include one or more arithmetic logic units (ALUs); be a multi-core processor; include one or more processors 111; or any other suitable processor.

Memory 113 may be any form of volatile or non-volatile memory including, without limitation, magnetic media, optical media, random access memory (RAM), read-only memory (ROM), flash memory, removable media, or any other suitable local or remote memory component or components. In particular embodiments, memory 113 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 113 may include one or more memories 113, where appropriate. Memory 113 may store any suitable data or information utilized by IVMS 102, including software embedded in a computer readable medium, and/or encoded logic incorporated in hardware or otherwise stored (e.g., firmware). In particular embodiments, memory 113 may include main memory for storing instructions for processor 111 to execute or data for processor 111 to operate on. In particular embodiments, one or more memory management units (MMUs) may reside between processor 111 and memory 113 and facilitate accesses to memory 113 requested by processor 111.

As an example and not by way of limitation, IVMS 102 may load instructions from storage 115 or another source (such as, for example, another computer system) to memory 113. Processor 111 may then load the instructions from memory 113 to an internal register or internal cache. To execute the instructions, processor 111 may retrieve the instructions from the internal register or internal cache and decode them. During or after execution of the instructions, processor 111 may write one or more results (which may be intermediate or final results) to the internal register or internal cache. Processor 111 may then write one or more of those results to memory 113. In particular embodiments, processor 111 may execute only instructions in one or more internal registers or internal caches or in memory 113 (as opposed to storage 115 or elsewhere) and may operate only on data in one or more internal registers or internal caches or in memory 113 (as opposed to storage 115 or elsewhere).

In particular embodiments, storage 115 may include mass storage for data or instructions. As an example and not by way of limitation, storage 115 may include a hard disk drive (HDD), a floppy disk drive, flash memory, an optical disc, a magneto-optical disc, magnetic tape, or a Universal Serial Bus (USB) drive or a combination of two or more of these. Storage 115 may include removable or non-removable (or fixed) media, where appropriate. Storage 115 may be internal or external to IVMS 102, where appropriate. In particular embodiments, storage 115 may be non-volatile, solid-state memory. In particular embodiments, storage 115 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 115 may take any suitable physical form and may comprise any suitable number or type of storage. Storage 115 may include one or more storage control units facilitating communication between processor 111 and storage 115, where appropriate.

In particular embodiments, interface 117 may include hardware, encoded software, or both providing one or more interfaces for communication (such as, for example, packet-based communication) among IVMS 102, mobile device 104, media storage system 106, any networks, any network devices, and/or any other computer systems. As an example and not by way of limitation, communication interface 117 may include a network interface controller (NIC) or network adapter for communicating with an Ethernet or other wire-based network and/or a wireless NIC (WNIC) or wireless adapter for communicating with a wireless network.

In some embodiments, interface 117 comprises one or more radios coupled to one or more physical antenna ports 116. Depending on the embodiment, interface 117 may be any type of interface suitable for any type of network with which the system 100 is used. As an example and not by way of limitation, the system 100 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the system 100 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. IVMS 102 may include any suitable interface 117 for any one or more of these networks, where appropriate.

In some embodiments, interface 117 may include one or more interfaces for one or more I/O devices. One or more of these I/O devices may enable communication between a person and IVMS 102. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more drivers enabling processor 111 to drive one or more of these I/O devices. Interface 117 may include one or more interfaces 117, where appropriate.

Bus 119 may include any combination of hardware, software embedded in a computer readable medium, and/or encoded logic incorporated in hardware or otherwise stored (e.g., firmware) to couple components of IVMS 102 to each other. As an example and not by way of limitation, bus 119 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 119 may include any number, type, and/or configuration of buses 119, where appropriate. In particular embodiments, one or more buses 119 (which may each include an address bus and a data bus) may couple processor 111 to memory 113. Bus 119 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 111 (such as, for example, one or more internal registers or caches), one or more portions of memory 113, one or more portions of storage 115, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Referring more specifically to the IVMS 102, the IVMS 102 can include media capture components 120a. The media capture components 120a can include video-capture hardware and/or software (e.g., video cameras), audio-capture hardware and/or software (e.g., microphones), combinations of same and/or the like. More particularly, in certain embodiments, the media capture components 120a can include an arrangement of video cameras in or around a vehicle. In an example, the media capture components 120a can include video cameras arranged around an exterior of the vehicle so as to capture a 360-degree field of view. For example, the 360-degree field of view can be captured by front, left, right, and rear-facing video cameras that each individually have, for example, a 120-degree field of view. In addition, or alternatively, the media capture components 120a can include one or more video cameras positioned inside the vehicle. Additionally, in some embodiments, at least some of the video cameras of the media capture components 120a can be video cameras configured for use in low lighting (e.g., night-vision cameras).

Referring now more specifically to the mobile device 104, the mobile device 104 can include a media capture component 120b and a battery 118. The media capture component 120b can include video-capture hardware and/or software (e.g., a camera), audio-capture hardware and/or software (e.g., a microphone), combinations of same, and/or the like. In a typical embodiment, the media capture component 120b enables the mobile device 104 to capture the live media stream for processing and storage. The battery 118 typically provides a limited power source to the mobile device 104.

Furthermore, the IVMS 102, the mobile device 104 and the media storage system 106 can include a media processor 112(1), a media processor 112(2) and a media processor 112(3), respectively (collectively, media processor(s) 112). The media processor(s) 112 can include software and/or hardware to process a live media stream and store the live media stream in memory in the form of a database (e.g., in the storage 115, 125 and/or 135). For example, in some embodiments, metadata related to each media stream can be stored in relation to the media stream as a database record. It should be appreciated that the media processor(s) 112 are shown for illustrative purposes.

In various embodiments, some of the media processor(s) 112 can be omitted. For example, in some embodiments, processing and storage of live media streams can occur entirely on the IVMS 102. In these embodiments, the media processor 112(2) of the mobile device 104 and/or the media processor 112(3) of the media storage system 106 can be omitted. In addition, in some embodiments, processing and storage of the media stream can occur on two or more of the IVMS 102, the mobile device 104 and the media storage system 106. In these embodiments, the functionality described herein that is attributed to the media processor(s) 112 can be distributed among two or more of the IVMS 102, the mobile device 104 and the media storage system 106. In addition, or alternatively, the media processor 112(1), the media processor 112(2) and the media processor 112(3) can perform at least some of the same functionality in parallel. In general, it should be appreciated that the particular arrangement of the IVMS 102, the mobile device 104 and the media storage system 106 is illustrative in nature. In various implementations, more, fewer or different components can implement the functionality of the system 100.

In certain embodiments, the media processor(s) 112 can implement intelligent, multiple-resolution storage of video data. In an example, the media processor 112(1) can continuously receive raw video frames from video cameras represented in the media capture components 120a and strategically process and downscale the raw video frames in real-time as the raw video frames are received. In certain embodiments, the media processor 112(1) can automatically identify targets within each raw video frame and optimize the downscaling based on any targets that are identified. In various embodiments, the media processor 112(1) can perform the above-described functionality for a particular camera, selected cameras, or all available cameras. For example, in some embodiments, the media processor 112(1) can perform the above-described multiple-resolution functionality exclusively for a front camera, exclusively from a rear camera, for all exterior cameras involved in a 360-degree field of view, combinations of the foregoing and/or the like. The media processor 112(2), for example, can perform similar multiple-resolution functionality with respect to video received from the media capture component 120b. In addition, or alternatively, the media processor 112(3) can perform similar functionality with respect to video streams stored on the storage 135. Example functionality of the media processor(s) 112 will be described in greater detail with respect to FIGS. 2-3.

When, for example, certain video cameras of the media capture components 120a are arranged to form a 360-degree view of a point of reference such as the vehicle, the media processor(s) 112(1) can also blend together video streams from such video cameras into a single viewable 360-degree stream. In some cases, the media processor 112(1) can create multiple 360-degree streams at multiple resolutions (e.g., one such stream for each resolution at which video frames are retained). In various embodiments, the media processor 112(1), or another component, can enable users to navigate within the 360-degree streams and save additional views, for example, to the storage 115 or other memory.

Figure 2:
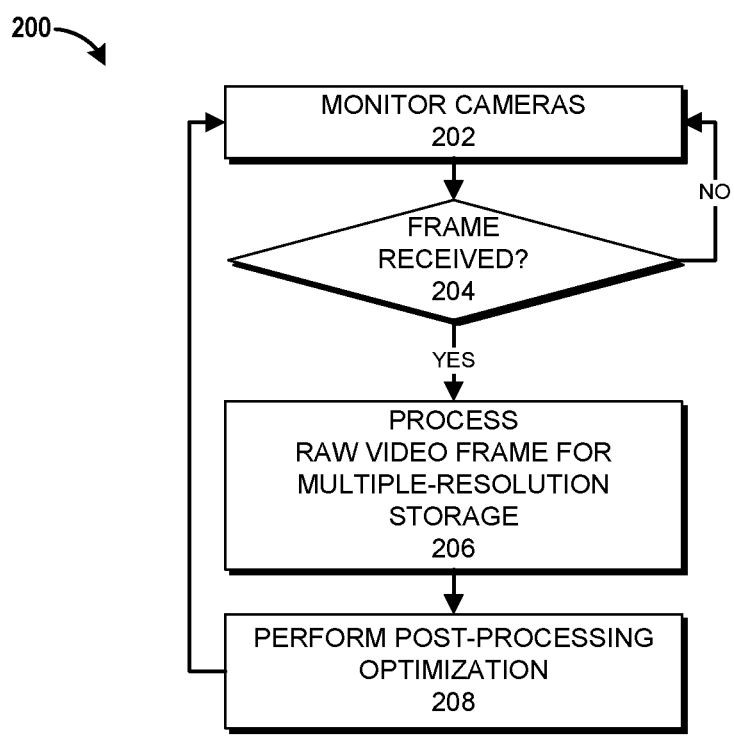
FIG. 2 illustrates an example of a process for recording video from video cameras.

FIG. 2 illustrates an example of a process 200 for recording video from video cameras. For example, the process 200, in whole or in part, can be implemented by one or more of the IVMS 102, the mobile device 104, the media storage system 106, the media processor 112(1), the media processor 112(2), the media processor 112(3), the media capture components 120a, and/or the media capture component 120b. The process 200 can also be performed generally by the system 100. Although any number of systems, in whole or in part, can implement the process 200, to simplify discussion, the process 200 will be described in relation to the IVMS 102 and components thereof.

At block 202, the media processor 112(1) monitors video cameras of the media capture components 120a. At decision block 204, the media processor 112(1) determines whether a new raw video frame has been received. If not, the process 200 returns to block 202, where the media processor 112(1) continues to monitor the video cameras. Otherwise, if it is determined at decision block 204 that one or more raw video frames have been received from one or more video cameras, the process 200 proceeds to block 206 and executes in parallel for each raw video frame that is received. For ease of description, blocks 206-208 of the process 200 will be described with respect to a raw video frame received from a particular video camera of the media capture components 120a.

At block 206, the media processor 112(1) processes the raw video frame for multiple-resolution storage. In general, block 206 can include the media processor 112(1) downscaling the raw video frame to one or more resolutions so as to yield one or more downscaled video frames. In addition, or alternatively, the block 206 can include identifying a location of a target or region of interest in the raw video frame. For example, the media processor 112(1), or a component in communication with the media processor 112(1), can identify a person, a vehicle, a license plate, combinations of same and/or the like. In some embodiments, the identified location can be expressed as two-dimensional coordinates that represent a centroid of the target. In embodiments in which the block 206 includes target detection, the block 206 can further include, for example, automatically cropping an area of interest that includes the centroid and, in some cases, downscaling the cropped area of interest to one or more resolutions so as to yield additional scaled video frames. Some or all video frames resulting from the block 206 can be stored, for example, in the storage 115. Examples of functionality that can be included in the block 206 will be described in greater detail with respect to FIG. 3.

At block 208, the media processor 112(1) performs post-processing optimization. For example, in certain embodiments, the media processor 112(1) can cause the particular video camera that provided the raw video frame to pan and/or tilt so as to center an identified target in its field of view. In some embodiments, the block 208 can be omitted. From block 208, the media processor 112(1) returns to block 202 and proceeds as described above. In general, the process 200 can iteratively execute, for example, at 20 fps, 30 fps, 40 fps, etc. for each video camera of the media capture components 120a. The process 200 can be terminated when the IVMS 102 is shut down, when all video cameras of the media capture components 120a stop recording, upon manual termination by a user, or whenever other suitable termination criteria is satisfied.

Figure 3:
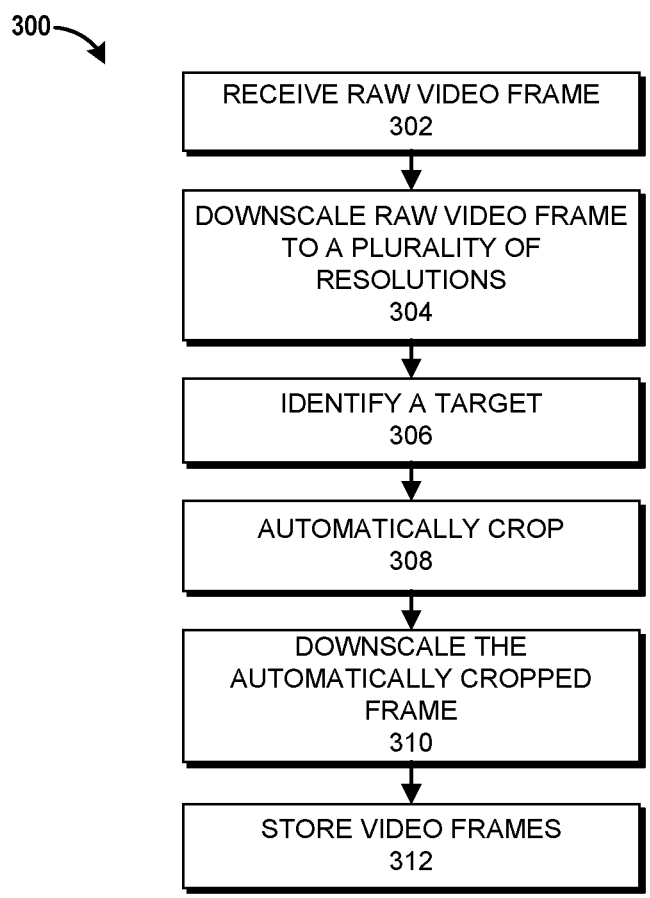
FIG. 3 illustrates an example of a process for multiple-resolution storage of video.

FIG. 3 illustrates an example of a process 300 for multiple-resolution storage of video. In certain embodiments, an instance of the process 300 can be executed in real-time for each video frame that is received during the process 200 of FIG. 2. For example, with respect to some or all of the cameras of the media capture components 120a (e.g., front camera, rear camera, side cameras, combinations of foregoing and/or the like), the process 300 can repeatedly execute at approximately 20 fps, 30 fps, 40 fps, etc. In these embodiments, the process 300 represents an example of functionality that can be performed with respect to a particular camera at blocks 204-206 of FIG. 2. For example, the process 300, in whole or in part, can be implemented by one or more of the IVMS 102, the mobile device 104, the media storage system 106, the media processor 112(1), the media processor 112(2), the media processor 112(3), the media capture components 120a, and/or the media capture component 120b. The process 300 can also be performed generally by the system 100. Although any number of systems, in whole or in part, can implement the process 300, to simplify discussion, the process 300 will be described in relation to the IVMS 102 and components thereof.

At block 302, the media processor 112(1) receives a raw video frame from a video camera represented in the media capture components 120a. At block 304, the media processor 112(1) downscales the raw video frame to a plurality of resolutions so as to yield a plurality of scaled video frames. For example, if the resolution of the raw video frame is 3960 by 2160, the media processor 112(1) could downscale the raw video frame to 1080p, 480p, another suitable resolution, etc. In that way, the downscaling at block 304 can yield a scaled video frame for each resolution to which the raw video frame is downscaled.

At block 306, the media processor 112(1) can identify a target in the raw video frame or in one of the scaled video frames resulting from block 304. The target can represent, for example, a vehicle, a license plate, a person, etc. In certain embodiments, the target can be located, for example, by a software component in communication with the media processor 112(1), such that the identification at block 306 involves receiving coordinates of a centroid of the target from the software component. In some embodiments, the block 306 can include selecting from among a plurality of potential targets such as, for example, a vehicle, a license plate, person, etc. In certain cases, the media processor 112(1) can make this selection, for example, by prioritizing identification of people, vehicles, and license plates, sometimes in that order.

At block 308, the media processor 112(1) automatically crops one or more of the raw video frame and the scaled video frames based on the identified location of the target. In certain embodiments, the block 308 can include cropping the chosen video frame to have a narrower field of view. In an example, if the raw video frame provides a 120-degree field of view, the cropped video frame could have a 60-degree field of view that is centered on the identified location of the target. In some embodiments, the automatic cropping can be performed on the raw video frame regardless of which video frame was used to identify the target at block 306. In addition, or alternatively, the automatic cropping can be performed on one or more of the scaled video frames regardless of which video frame was used to identify the target at block 306. Further, in some embodiments, the automatic cropping can be performed on the same video frame in which the target was identified at block 306. In various embodiments, the block 308 can also include performing a digital zoom on the identified location of the target.

At block 310, the media processor 112(1) can downscale the automatically cropped video frame to one or more resolutions. For example, if the media processor 112(1) has automatically cropped the raw video frame at block 308, the media processor 112(1) can downscale the automatically cropped raw video frame to 1080p, 480p, a combination of the foregoing and/or the like. By way of further example, if the media processor 112(1), at block 308 described above, automatically cropped a scaled video frame (e.g., a scaled video frame that resulted from block 304 described above), the media processor 112(1) can further downscale the cropped and scaled video frame to one or more other resolutions such as, for example, 480p, another suitable resolution, combinations of the foregoing and/or the like. In some embodiments, such as the scenario in which the automatic cropping at block 308 was performed on a scaled video frame, additional downscaling at the block 310 may be omitted. In general, the downscaling at block 310 can yield a scaled video frame for each resolution to which the automatically cropped video frame is downscaled.

At block 312, the media processor 112(1) stores each video frame as part of a corresponding video stream in the storage 115. For example, if the media processor 112(1) is creating a first video stream at 1080p, a second video stream at 480p, a third video stream that represents a 1080p crop and a fourth video stream that represents a 480p crop, the block 312 can include storing a scaled 1080p video frame as part of the first video stream, a scaled 480p video frame as part of the second video stream, a scaled and cropped 1080p video frame as part of the third video stream, and a scaled and cropped 480p video frame as part of the fourth video stream. In that way, each iteration of the process 300 can result in video frames being added to respective video streams in the storage 115.

Advantageously, in certain embodiments, the process 300, when iteratively executed as part of an overall video-recording process such as the process 200 of FIG. 2, can result in improved recording, storage, and playback decisions. Consider an example in which raw video from a given video camera results in four stored video streams: an uncropped 1080p video stream, an uncropped 480p video stream, a cropped 1080p video stream, and a cropped 480p video stream. According to this example, the uncropped 480p video stream and/or the cropped 480p video may be particularly suitable for live streaming to the media storage system 106 or another computer system such as a mobile device, with the cropped 480p video stream providing a greater opportunity for transmission efficiency. Also according to this example, the cropped and/or uncropped 1080p video streams may be particularly suitable for evidentiary use at a later time (e.g., after a later, non-real-time transmission to the media storage system 106 or another component). Furthermore, in some embodiments, as storage resources are depleted and/or on a periodic basis, the IVMS 102 can strategically delete higher-resolution video streams (e.g., the cropped and/or uncropped 1080p video streams) that are not marked as events or that correspond to certain types of low-priority events (e.g., traffic stops). In addition, or alternatively, users such as police officers can make informed decisions as to which streams to retain and which streams to delete.

As further technical advantages, in some embodiments, the media processor(s) 112 can create more detailed and more relevant video via target and region-of-interest detection as described above. In these embodiments, maintaining raw video frames from video cameras may not be feasible due to the limited storage resources of a mobile or portable storage environment. However, as described above, in certain cases, target identification can be performed in real-time on the raw video frames before the raw video frames are discarded. By performing the target identification on the raw video frames in real-time, analysis, cropping and storage can be based on the greater video detail contained within the raw video frames. In these embodiments, target identification and multiple-resolution storage based thereon can be better facilitated. For example, even if only a cropped, lower-resolution video stream, such as a 480p video stream, is ultimately retained, the cropped, lower-resolution 480p video stream can be an automatic result of a real-time, frame-by-frame analysis and strategic pruning of the raw video frames before access to the raw video frames is lost. Consequently, the cropped, lower-resolution 480p video stream can more accurately represent a relevant portion of video using fewer storage resources as compared, for example, to a straight 480p scaling of the raw video frames.

For illustrative purposes, the processes 200 and 300 are described with respect to raw video frames received by the media processor 112(1) of the IVMS 102 of FIG. 1. It should be appreciated that the processes 200 and 300 can also be performed, for example, by the media processor 112(2) and/or the media processor 112(3), although video resolutions different from the examples described above may be used. For example, with respect to the mobile device 104 of FIG. 1, the media processor 112(2) may perform processes similar to those of the processes 200 and 300 with respect to raw video supplied by the media capture component 120*b*. By way of further example, with respect to the media storage system 106 of FIG. 1, the media processor 112(3) may perform processes similar to those of the processes 200 and 300 with respect to raw video and/or scaled video supplied by the IVMS 102 over the communication link 110, although the video resolution of such video may be somewhat lower (e.g., 1080p or 480p) to accommodate for the cost of transmitting over the communication link 110.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
    continuously receiving, from a plurality of cameras, raw video frames at an initial resolution, wherein the plurality of cameras are arranged to provide a 360-degree view relative to a point of reference;
    for each camera of the plurality of cameras, for each raw video frame, as the raw video frame is received:
        downscaling the raw video frame to a first resolution to yield a first scaled video frame;
        downscaling the raw video frame to a second resolution distinct from the first resolution to yield a second scaled video frame;
        identifying a location of a target in at least one of the raw video frame, the first scaled video frame, and the second scaled video frame;
        cropping at least one video frame selected from among the raw video frame, the first scaled video frame, and the second scaled video frame based, at least in part, on the location of the target;
        downscaling the cropped at least one video frame to a third resolution to yield a third scaled video frame; and
        storing the first scaled video frame, the second scaled video frame, and information related to the cropped at least one video frame as part of a first video stream, a second video stream, and a third video stream, respectively; and
    blending together a video stream of each of the plurality of cameras into a 360-degree video stream, wherein the video stream of each of the plurality of cameras comprises at least one of the first video stream, the second video stream, and the third video stream.

2. The method of claim 1, wherein, for at least one camera of the plurality of cameras, the identifying comprises identifying the location of the target in the raw video frame.

3. The method of claim 1, wherein the third resolution is the same as at least one of the first resolution and the second resolution.

4. The method of claim 1, comprising:
    downscaling the cropped at least one video frame to a fourth resolution to yield a fourth scaled video frame; and
    storing the fourth scaled video frame as part of a fourth video stream.

5. The method of claim 1, wherein the storing the information related to the cropped at least one video frame comprises storing the cropped at least one video frame as part of the third video stream.

6. The method of claim 1, wherein the cropping comprises cropping the at least one video frame to a narrower field of view.

7. The method of claim 1, wherein the at least one video frame is the raw video frame.

8. The method of claim 1, wherein the target is selected from the group consisting of person, vehicle, and license plate.

9. The method of claim 1, wherein the identifying comprises selecting from among a plurality of potential targets.

10. The method of claim 9, wherein the selecting prioritizes identification of people over other potential targets.

11. The method of claim 1, comprising causing at least one of the plurality of cameras to at least one of pan and tilt based, at least in part, on the location of the target.

12. A system comprising a processor and memory, wherein the processor and memory in combination are operable to implement a method comprising:
continuously receiving, from a plurality of cameras, raw video frames at an initial resolution, wherein the plurality of cameras are arranged to provide a 360-degree view relative to a point of reference;
for each camera of the plurality of cameras, for each raw video frame, as the raw video frame is received:
downscaling the raw video frame to a first resolution to yield a first scaled video frame;
downscaling the raw video frame to a second resolution distinct from the first resolution to yield a second scaled video frame;
identifying a location of a target in at least one of the raw video frame, the first scaled video frame, and the second scaled video frame;
cropping at least one video frame selected from among the raw video frame, the first scaled video frame, and the second scaled video frame based, at least in part, on the location of the target;
downscaling the cropped at least one video frame to a third resolution to yield a third scaled video frame; and
storing the first scaled video frame, the second scaled video frame, and information related to the cropped at least one video frame as part of a first video stream, a second video stream, and a third video stream, respectively; and
blending together a video stream of each of the plurality of cameras into a 360-degree video stream, wherein the video stream of each of the plurality of cameras comprises at least one of the first video stream, the second video stream, and the third video stream.

13. The system of claim 12, wherein, for at least one camera of the plurality of cameras, the identifying comprises identifying the location of the target in the raw video frame.

14. The system of claim 12, wherein the third resolution is the same as at least one of the first resolution and the second resolution.

15. The system of claim 12, the method comprising:
downscaling the cropped at least one video frame to a fourth resolution to yield a fourth scaled video frame; and
storing the fourth scaled video frame as part of a fourth video stream.

16. The system of claim 12, wherein the storing the information related to the cropped at least one video frame comprises storing the cropped at least one video frame as part of the third video stream.

17. The system of claim 12, wherein the identifying comprises selecting from among a plurality of potential targets.

18. The system of claim 17, wherein the selecting prioritizes identification of people over other potential targets.

19. The system of claim 12, the method comprising causing at least one of the cameras to at least one of pan and tilt based, at least in part, on the location of the target.

20. A computer-program product comprising a non-transitory computer-usable medium having computer-readable program code embodied therein, the computer-readable program code adapted to be executed to implement a method comprising:
continuously receiving, from a plurality of cameras, raw video frames at an initial resolution, wherein the plurality of cameras are arranged to provide a 360-degree view relative to a point of reference;
for each camera of the plurality of cameras, for each raw video frame, as the raw video frame is received:
downscaling the raw video frame to a first resolution to yield a first scaled video frame;
downscaling the raw video frame to a second resolution distinct from the first resolution to yield a second scaled video frame;
identifying a location of a target in at least one of the raw video frame, the first scaled video frame, and the second scaled video frame;
cropping at least one video frame selected from among the raw video frame, the first scaled video frame, and the second scaled video frame based, at least in part, on the location of the target;
downscaling the cropped at least one video frame to a third resolution to yield a third scaled video frame; and
storing the first scaled video frame, the second scaled video frame, and information related to the cropped at least one video frame as part of a first video stream, a second video stream, and a third video stream, respectively; and
blending together a video stream of each of the plurality of cameras into a 360-degree video stream, wherein the video stream of each of the plurality of cameras comprises at least one of the first video stream, the second video stream, and the third video stream.

* * * * *